United States Patent
Lou et al.

(10) Patent No.: US 6,895,357 B2
(45) Date of Patent: May 17, 2005

(54) OFFSET CALIBRATION OF A SEMI-RELATIVE STEERING WHEEL ANGLE SENSOR

(75) Inventors: Yongle Lou, Shelby Township, MI (US); Ralf Endress, Troy, MI (US); Peter Olejnik, Orion Township, MI (US); Michael C. Glover, Huntington Woods, MI (US); Paul Baker, Rochester Hills, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 106 days.

(21) Appl. No.: 10/260,486

(22) Filed: Sep. 30, 2002

(65) Prior Publication Data

US 2004/0061500 A1 Apr. 1, 2004

(51) Int. Cl.$^7$ .................. G01C 17/00; G01C 19/00; G01C 9/00; G06F 15/00
(52) U.S. Cl. ................. 702/151; 701/36; 701/41; 702/104
(58) Field of Search ................. 702/104, 150, 702/151; 701/1, 23, 34, 41, 43, 48, 72; 340/438; 180/271, 402, 446; 73/118.1

(56) References Cited

U.S. PATENT DOCUMENTS

| 5,032,996 | A | * | 7/1991 | Shiraishi ............... 701/41 |
| 5,719,790 | A | * | 2/1998 | Lohrenz et al. ........ 702/104 |
| 5,787,375 | A | | 7/1998 | Madau et al. .......... 701/41 |
| 5,790,966 | A | | 8/1998 | Madau et al. .......... 701/41 |
| 6,141,605 | A | * | 10/2000 | Joyce ................. 701/1 |
| 6,158,132 | A | * | 12/2000 | Kofink et al. .......... 33/1 PT |
| 6,208,921 | B1 | * | 3/2001 | Tsunehara et al. ...... 701/41 |
| 6,374,163 | B1 | | 4/2002 | Lou et al. ............ 701/1 |
| 6,502,025 | B1 | * | 12/2002 | Kempen ............... 701/41 |
| 6,580,989 | B1 | * | 6/2003 | Daugherty et al. ..... 701/41 |
| 2003/0212476 | A1 | * | 11/2003 | Aanen et al. .......... 701/1 |
| 2004/0024565 | A1 | * | 2/2004 | Yu et al. ............. 702/151 |
| 2004/0030474 | A1 | * | 2/2004 | Samuel et al. ........ 701/36 |

FOREIGN PATENT DOCUMENTS

JP         406234366 A  *  8/1994

* cited by examiner

Primary Examiner—John Barlow
Assistant Examiner—John Le

(57) ABSTRACT

A new method for determining an actual steering wheel angle is provided that does not require re-calculation of a steering center upon each ignition of the vehicle. Accordingly, the vehicle dynamic controller may be activated very quickly after ignition, while a less costly relative steering wheel angle sensor may be employed.

22 Claims, 3 Drawing Sheets

OFFSET CALIBRATION OF A SEMI-RELATIVE STEERING WHEEL ANGLE SENSOR

FIELD OF THE INVENTION

The present invention relates generally to steering wheel angle detection, and more specifically to a steering angle sensor and method of operation.

BACKGROUND OF THE INVENTION

The determination of the steering center of a moving vehicle is important for several advanced vehicle functions, such as those run by the vehicle dynamic controller, i.e. vehicle traction control. It is important to learn this value as early in the driving cycle as possible so that these vehicle functions may be activated in a timely manner.

One known way of determining the steering center of a moving vehicle is the use of an absolute steering wheel angle sensor. An absolute steering wheel angle sensor provides the actual position of the steering wheel at any point in the vehicle's driving cycle. Unfortunately, these sensors are complex and costly.

Another method utilizes relative steering wheel angle sensors, which are less complex and costly as compared with the absolute steering wheel angle sensors. This type of sensor does not provide the absolute position of the steering wheel. A relative steering wheel angle sensor (RSAS) generates a relative steering wheel angle, that is, relative to the initial position which the steering mechanism occupied when the ignition was turned on. Since it cannot be guaranteed that a vehicle is always started with the steering mechanism in the straight-ahead position, it becomes necessary to estimate the location of the center position. When the center position is located, an RSAS offset value may be computed which will be used to adjust the measured value given by the relative sensor (RSAS).

Accordingly, after the vehicle is started, the electrical control unit (ECU) calculates the center position, and hence the initial RSAS offset. This calculation requires the vehicle to be moving at a certain speed range and in a straight-ahead manner. Calculating the offset depends on the vehicle speed, the road surface condition, and the driving maneuver. Unfortunately, during this "calculation" time period the vehicle dynamic controller is temporarily disabled.

Another significant drawback occurs between ignition on/off cycles. Storing the calculated RSAS offset value to memory during ignition turn-off is not satisfactory, because the ECU always treats the RSAS reading of the steering mechanism as at zero degrees when the ignition turns on. Since the steering wheel is not necessarily in the original position of the prior cycle when the ignition is turned off, this value cannot be used. Thus, the ECU usually stores the last steering wheel angle (SWA) actual position to memory when the ignition turns off. Unfortunately, if the ECU utilizes this saved SWA when the ignition is turned on, the calculated "center" position and the estimated RSAS offset could be erroneous since the steering wheel may have been moved while the ignition was turned off.

Therefore, there exists the need to provide a steering wheel angle sensor that quickly provides a highly accurate value of the steering wheel angle so that advanced vehicle functions may be readily activated, while also providing cost savings to lower the overall cost of the vehicle.

BRIEF SUMMARY OF THE INVENTION

The present invention provides a steering wheel angle sensor and a method of operation that retains steering wheel angle information during ignition-off of the vehicle. Accordingly, the vehicle may readily activate advanced vehicle function at ignition-on. Further, a relative steering wheel angle sensor is utilized reducing the cost of the system and vehicle.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
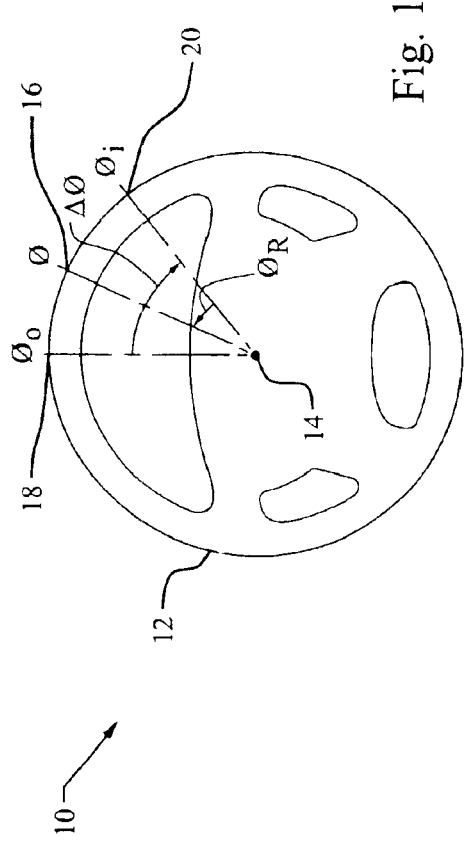
FIG. 1 depicts a steering wheel and the various relevant angles for explanation of the present invention.

Turning now to the figures, a new method for determining an actual steering wheel angle is provided that does not require re-calculation of the steering offset value upon each ignition of the vehicle. Accordingly, the vehicle dynamic controller may be activated sooner after ignition, while a less costly relative steering wheel angle sensor may be employed. As shown in FIG. 1, a steering mechanism 10 includes a steering wheel 12 which is rotated about a center point denoted by numeral 14. The steering wheel 12 includes a point 16 corresponding with the direction the vehicle is headed, and represents the actual angle $\theta$ of the steering wheel 12. A center position denoted by point 18 represents a zero degree steering wheel angle $\theta_0$ corresponding to the vehicle driving in a straight-ahead manner.

When the ignition of the vehicle is turned on, i.e. the vehicle enters an ignition-on state, the steering wheel may be at any given angle. As represented in FIG. 1, the initial steering wheel angle has been arbitrarily shown by point 20 and will be referenced as $\theta_i$. Because the electronic control unit 60 (FIG. 2) always treats the steering wheel 12 as occupied at the zero degree position when the ignition turns on, there is an offset angle representing the difference between the initial angle $\theta_i$ and the zero degree angle $\theta_0$, specifically referred to herein as the semi-relative steering wheel angle sensor offset or semi-RSAS offset $\Delta\theta$. Finally, a semi-relative steering wheel angle sensor (semi-RSAS) 82 (FIG. 2) detects a relative steering wheel angle $\theta_R$, i.e. the difference between the actual steering wheel angle $\theta$ and the initial steering wheel angle $\theta_i$ (when the semi-RSAS is initialized at start up).

Figure 2:
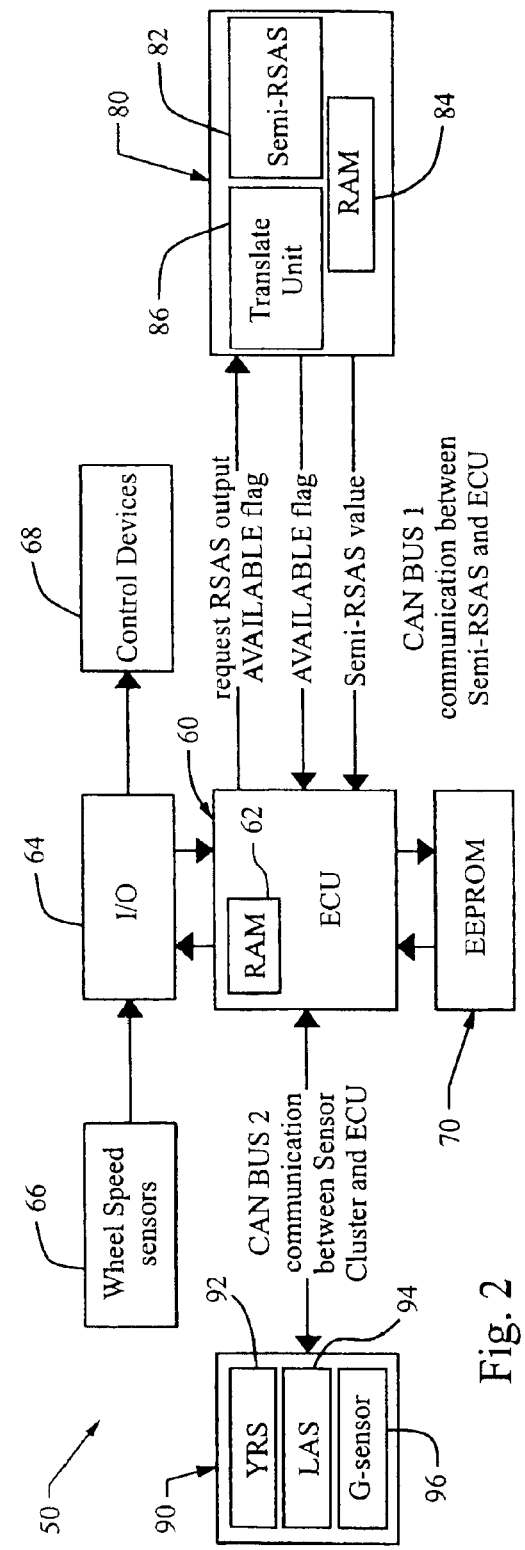
FIG. 2 is a schematic of the offset calibration system utilizing of a semi-relative steering wheel sensor, constructed in accordance with the teachings of the present invention.

Turning now to FIG. 2, the components and apparatus of a calibration system 50 have been depicted in schematic form. Centrally, an electrical control unit (ECU) has been shown at 60 and generally includes a random access memory (RAM) 62. The ECU 60 can also be thought of as a controller or central processing unit (CPU). The ECU communicates with the input/output unit 64 (I/O), which in turn receives various signals such as those outputted by the wheel speed sensor 66. The I/O unit 64 also sends commands to various control devices 68 such as a vehicle dynamic controller for operating such things as traction control. The ECU 60 also communicates with an electrical erasable programmable read only memory (EEPROM) 70. The EEPROM 70 is a nonvolatile memory which does not lose any data when its power supply is terminated.

The ECU 60 is also in communication with a sensor cluster or sensor module 90. The sensor module 90 includes a yaw rate sensor 92 (YRS), a lateral acceleration sensor 94 (LAS) and a longitudinal acceleration sensor (G-sensor) 96. Notably, the ECU 60 and the sensor cluster 90 communicate via CAN BUS, that is, the communication protocol utilized by the vehicle. Finally, the ECU 60 is in communication with a semi-RSAS offset calibration module 80, also via CAN BUS. The calibration module 80 generally includes a semi-relative steering wheel angle sensor (semi-RSAS) 82 that detects a relative position of the steering wheel 12 as described above. The calibration module 80 also includes a RAM 84 for storing and updating this information, and a translate unit 86 is utilized to allow the module 80 to communicate with the ECU 60 via the CAN BUS protocol.

CAN BUS 2 is used for communication between the YRS 92, LAS 94, longitudinal acceleration sensor 96 and the ECU 60. The ECU 60 monitors the input signals from all of the sensors in the sensor module 90, which are used to calculate a semi-RSAS offset value $\Delta\theta$. The calibration module 80 communicates with the ECU 60 via CAN BUS 1 in the following manner. First, calibration module 80 outputs the relative steering wheel angle $\theta_R$ at all times to the ECU 60. Second, the calibration module 80 also outputs a status flag to the ECU 60 at the same time. The status flag is used to indicate whether there is a valid semi-RSAS offset value $\Delta\theta$ corresponding to the detected relative steering wheel angle $\theta_R$. The status flag is set as either AVAILABLE or NOT AVAILABLE. When a semi-RSAS offset value $\Delta\theta$ is determined by the ECU 60, the ECU requests that the calibration module 80 to output an AVAILABLE status flag via CAN BUS 1 to confirm the offset setting. When the calibration module 80 receives the request, it resets the NOT AVAILABLE status flag and outputs the AVAILABLE flag to finish the offset confirmation. The ECU 60 does not activate the vehicle dynamic controller until receiving the AVAILABLE status flag from the calibration module 80.

As will be described in more detail below, the steering wheel monitoring system 50 and its method of use has more advanced features over the prior art. Namely, the semi-RSAS is capable of keeping the steering wheel angle information and automatically updating the steering angle at all times while the steering wheel 12 is rotated, even during an ignition-off state of the vehicle. Further, after the vehicle enters an ignition-on state, the ECU 60 directly reads the semi-RSAS offset value from the EEPROM 70 and activates the vehicle dynamic controller. The offset value is not an estimated or initial value, but rather it is an offset value with a high accuracy that was used in the previous ignition cycle. Whenever the vehicle is turned off, i.e. enters an ignition-off state, the offset value stores to the EEPROM 70. The ECU 60 only re-calculates the semi-RSAS offset value when either: a) the power to the semi-RSAS 82 was interrupted; or b) a failure was detected with the sensor module 90. Additionally, the offset value is capable of compensation by long-term adjustment. Still further, the calibration module 80 communicates with the ECU 60 via CAN BUS, providing a common communication protocol, and allowing for additional applications of the values detected, i.e. the steering wheel angle and offset values.

When the calibration module 80 and semi-RSAS 82 are connected with power for the first time, the relative steering position $\theta_R$ is initialized to zero, and the status flag is initialized to NOT AVAILABLE. The calibration module 80 outputs the NOT AVAILABLE status flag via CAN BUS 1 indicating there is no valid semi-RSAS offset value $\Delta\theta$ available. The ECU 60 is unable to calculate the actual steering wheel angle $\theta$ and the vehicle dynamic controller is temporarily disabled. The ECU 60 therefore has to calculate the semi-RSAS offset value $\Delta\theta$. As will be described herein, when the ECU 60 determines the vehicle is moving straight-ahead, the ECU sets the current relative steering wheel angle $\theta_R$ as the semi-RSAS offset value $\Delta\theta$, and more specifically as an initial offset value $\Delta\theta(t_0)$. That is because when the vehicle is heading straight forward, the actual steering wheel angle $\theta$ will be at the center position $\theta_0$, and the reading of the semi-RSAS 82 (i.e. the semi-relative steering wheel angle $\theta_R$) will reflect the difference between the initial steering wheel angle $\theta_i$ and the center position of the steering wheel $\theta_0$.

Once the ECU 60 calculates the initial semi-RSAS offset value $\Delta\theta(t_0)$, the ECU 60 requests that the calibration module 80 output the AVAILABLE flag via CAN BUS to confirm the offset setting. After receiving the AVAILABLE status flag from the calibration module 80, the ECU 60 activates the vehicle dynamic controller and uses the calculated semi-RSAS offset value $\Delta\theta$ to calculate the actual steering wheel angle $\theta$ and its velocity for the vehicle dynamic controller.

As long as power to the calibration module 80 and the semi-RSAS 82 is not interrupted, even if the ignition was turned off, the semi-RSAS 82 continues updating the relative steering wheel angle $\theta_R$ while the steering wheel 12 is rotated. The semi-RSAS 82 does not lose any angle. At the next starting of the vehicle, i.e. when the vehicle enters an ignition-on state, the calibration module 80 outputs an AVAILABLE status flag to the ECU 60 that indicates there is a valid semi-RSAS offset value $\Delta\theta$ available in the EEPROM 70. The ECU 60 directly reads the offset value $\Delta\theta$ and more specifically the last known offset $\Delta\theta(t_n)$ (typically $\Delta\theta_{fil}(t_n)$ as will be discussed herein), from the EEPROM 70 and activates the vehicle dynamic controller.

While the vehicle is running, if a failure related with the sensor module 90 is detected via CAN BUS 2, the ECU 60 sets a failure flag to the EEPROM 70 that indicates there is no valid offset value $\Delta\theta$. When the vehicle enters the ignition-on state at the next cycle, the ECU 60 will read from the EEPROM 70 the failure flag and determine there is no valid offset value $\Delta\theta$ available. This is true even if the calibration module 80 outputs an AVAILABLE status flag at that time.

Accordingly, when the ignition switch is on and the vehicle enters an ignition-on state, the ECU 60 reads the status flag from the calibration module 80 and checks the failure flag of the previous ignition cycle from the EEPROM 70 to determine if a valid semi-RSAS offset value $\Delta\theta$ is available. If the calibration module 80 outputs and AVAILABLE flag and the failure flag is not set, the ECU 60 extracts the last known semi-RSAS offset value $\Delta\theta(t_n)$ and sets this value as the initial offset value $\Delta\theta(t_0)$ of this ignition cycle and activates the vehicle dynamic controller. If for some reason the power was interrupted to the calibration module 80 and the semi-RSAS 82, all of the data of the calibration module 80 was reset including the status flags. Thus, when the power is back on, the calibration module 80 outputs the current steering position as the initial angle $\theta_I$ and the status flag is NOT AVAILABLE. In this case, the ECU 60 will have to calculate the initial offset $\Delta\theta(t_0)$ again.

The ECU 60 is monitoring the vehicle performance through output signals of various difference sensors such as wheel speed sensor 66, yaw rate sensor 92, lateral acceleration sensor 94 and longitudinal acceleration sensor 96. Some of the sensors and/or other sensors are put together in a box forming a sensor cluster or sensor module 90, which is typically mounted on the inside of the floor of the vehicle. The ECU 60 utilizes an algorithm to determine when the vehicle is heading in a straight-forward manner. Generally, the ECU 60 is looking for a yaw rate value of the vehicle being close to zero for a relatively long time period. Additionally, a FOURIER transform is used to calculate the amplitude of the vehicle rigid body natural frequency, by using a series of yaw rate sample data, that data being less than a certain range of tolerance. This will occur when the vehicle is driving straight on the surface of a smooth road, regardless of the position of the steering wheel at that time. This means the algorithm is robust against misalignments in the steering assembly and the front axle.

After calculating the initial offset $\Delta\theta(t_0)$, the ECU 60 continues monitoring the vehicle performance to adjust the semi-RSAS offset $\Delta\theta$ to eliminate the deviation of sample data. The ECU 60 re-calculates the initial semi-RSAS offset $\Delta\theta(t_0)$ if and only if, power was interrupted to the calibration module 80 and semi-RSAS 82 (resetting all the values and outputting a NOT AVAILABLE status flag) or, a failure related with the sensor module 90 was detected in the previous ignition-on cycle. If the signals of the sensor module 90 are not valid, the ECU 60 is unable to judge if the vehicle is driving in a straight-ahead line.

Figure 3:
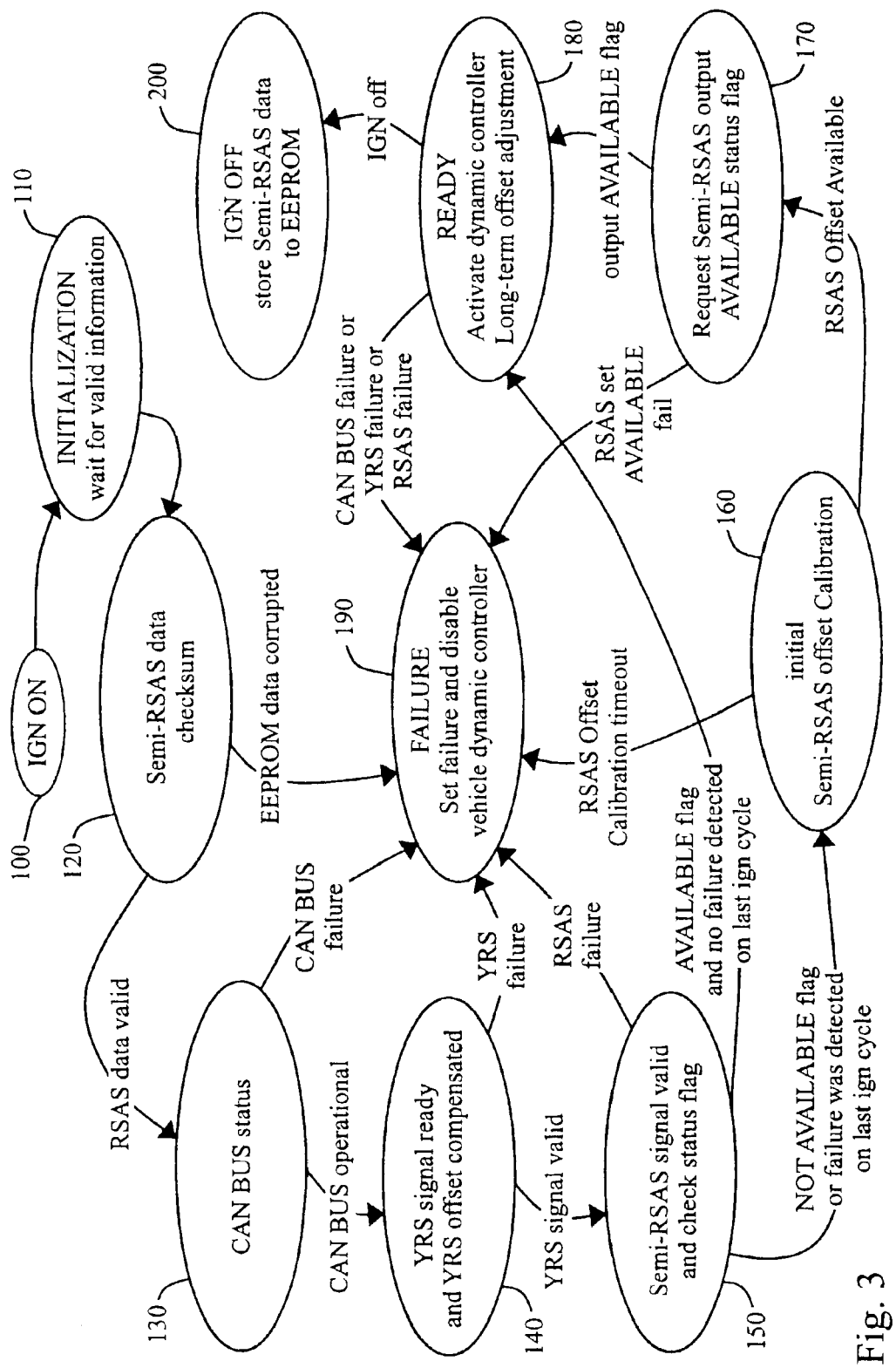
FIG. 3 is a state diagram depicting the different states of the offset calibration system during the offset calibration procedure.

Referring now to FIG. 3, a state-variable diagram has been shown to describe the different states of the steering wheel angle system 50 during the offset calibration procedure and the relation between the various states. The state-variable approach design is utilized to avoid nested if-then-else structures. After the vehicle enters an ignition-on state identified by reference numeral 100 the system 50 goes into an initialization state 110. The initialization state 110 is designed to delay a predefined period of time after the ignition is turned on. The main reasons for this initialization state and delay is to wait for the calibration module 80 to finish its initialization, during which the semi-RSAS 82 is unable to output valid data. Similarly, the YRS 92 needs to finish its initialization, and requires a certain amount of time to finish its signal calibration and set signal ready. Finally, the ECU 60 must wait for the semi-RSAS data to become available in its RAM 62. During ignition-on, the ECU 60 reads a set of the semi-RSAS data from the EEPROM 70 to the RAM 62. This initialization state 110 occurs once for one ignition cycle.

The next state is a semi-RSAS data checksum state 120. This state is to make sure if a set of the semi-RSAS values stored in the EEPROM 70 is valid. To determine validity, the calculation method called a checksum is applied to the set of the semi-RSAS values for providing error detection. After initialization 110, the ECU 60 calculates the checksum of the semi-RSAS data in the RAM 62 and compares it with a checksum value stored on the EEPROM 70 at the previous ignition cycle. If the checksum values are not identical, the EEPROM 70 was corrupted and the ECU 60 issues a failure. In this case, the system 50 enters the failure state 190, in which a failure flag will be set to the EEPROM 70 and the vehicle dynamic controller will be disabled. The semi-RSAS data checksum state 120 occurs once for one ignition cycle. If the RSAS data is valid, the CAN BUS status state 130 is entered.

The next state is the CAN BUS operational state 130. The calibration module 80 outputs data via CAN BUS 1. The ECU 60 further checks if the CAN BUS is operational by determining the following items: a) CAN BUS is functional; b) no signal is missing; and c) no failure has occurred between the semi-RSAS 82 and the translate unit 86. The ECU 60 will disable the calibration module 80 if a failure was detected with the CAN BUS, and enter the failure state 190. The ECU 60 checks if the CAN BUS signal is valid on every software loop after the initialization 110.

If the CAN BUS is operational, the YRS status state 140 is entered. The ECU 60 checks if the signal from the yaw rate sensor 92 is available, and if yaw rate sensor offset calibration has finished successfully. If the ECU 60 does not receive a yaw rate sensor valid signal or a yaw rate sensor initialization within 3.0 seconds, the ECU 60 will issue a failure. That is, the system 50 will enter the failure state 190. If the YRS signal is valid, the system 50 enters the semi-RSAS status state 150.

As briefly described above, a semi-RSAS data packet, including a current relative steering wheel angle $\theta_R$, status flag, and other status information, is sent to the ECU 60 directly from the calibration module 80 periodically via CAN BUS. In this state, the ECU 60 will declare that the calibration module 80 outputs valid data if the following conditions have been positively checked: a) the ordinal number of the data packet; and b) the checksum of the data packet; and c) an angle of the semi-RSAS 82 matches its mirror; d) a status flag of the calibration module 80 matches its mirror; and e) no error information is received from the translate unit 86. If the calibration module 80 is unable to output valid data within 3.0 seconds, the ECU 60 will confirm the failure that was set by BUS mode and disable the semi-RSAS calibration by entering the failure mode 190. The ECU 60 checks if the calibration module 80 outputs valid data on every software loop after the initialization state 110.

If the semi-RSAS 82 and calibration module 80 outputs valid data, the ECU 60 further checks the RSAS status flag to determine if a valid semi-RSAS offset $\Delta\theta$ is available. If the calibration module 80 outputs the AVAILABLE status flag and no failure related with the sensor module 90 was detected in the previous ignition-on cycle, the ECU 60 retrieves the last known offset value $\Delta\theta(t_n)$ from the EEPROM 70 and sets this value as the initial offset $\Delta\theta(t_0)$ for the current ignition cycle. Based on this offset value, the ECU 60 calculates an actual steering wheel angle $\theta$ and activates the vehicle dynamic controller. That is, the ready state 180 is entered as shown in FIG. 3. If the calibration module 80 outputs a NOT AVAILABLE status flag, or if a failure related with the sensor module 90 was detected in the previous ignition cycle (even if the calibration module 80 outputs an AVAILABLE status flag), the ECU 60 will continue to check vehicle driving conditions to calculate the initial semi-RSAS offset $\Delta\theta(t_0)$. That is, the system 50 enters the initial semi-RSAS offset calibration state 160.

In the initial semi-RSAS offset calibration state 160, the initial semi-RSAS offset $\Delta\theta(t_0)$ is calculated. This state 160 will only be entered if all of the proceeding states and their procedures have been successfully completed. Briefly, the calculation includes the ECU 60 checking if the vehicle's driving on the surface of a smooth road with straight-ahead course at a predetermined threshold speed or higher. Further, the ECU 60 checks whether the CAN BUS is functional, the YRS signal is valid, and the Semi-RSAS signal is valid. If these conditions are met, the ECU 60 sets the current relative steering wheel angle $\theta_R$ as the initial offset $\Delta\theta(t_0)$. If the vehicle speed is reaching the predetermined speed or higher for more than a certain time period, and the initial semi-RSAS offset $\Delta\theta(t_0)$ is unable to be calculated, the ECU 60 issues a time out failure and the system 50 enters the failure mode 190. However, the ECU 60 continues to monitor the vehicle performance to calculate the offset when the conditions mentioned above are met. These conditions are checked on every software loop.

This initial calibration state 160 also includes judging if the vehicle is stable. A frequency spectrum calculation is utilized to determine stability. If the above-mentioned conditions are fulfilled, the ECU 60 begins to calculate the amplitudes of the predetermined vehicle natural frequencies by using on-line frequency detection method as disclosed in U.S. Pat. No. 6,374,163, the disclosure of which is hereby incorporated in its entirety. Suffice it to say that the natural frequency of a given vehicle is determined by vehicle testing. As the vehicle consists of many mechanical parts, the vehicle has more than one degree of freedom. Each degree of freedom has its own natural frequency. In this situation, the natural frequency of the rigid body (typically around 2 Hz) and a natural frequency of the vehicle suspension (typically around 10 Hz) are relevant to the calculation.

When the vehicle is running on the surface of a rough road in a straight-ahead line, a fast FOURIER transform (FFT) calculates a complete frequency spectrum of the yaw rate of the vehicle. The frequency spectrum will show the maximum amplitude of a certain frequency, and the natural frequencies are evaluated.

If the average of the set of sampled yaw rate values (preferably of 100 software loops if a software loop time is 10 ms) has a sufficient strong central tendency, and if the amplitude of the interested natural frequencies (i.e. the vehicle rigid body and the suspension) are at the predetermined amplitude thresholds, the ECU 60 determines the vehicle is driving on a straight path and the vehicle is stable because excitation from the road is unable to cause the vehicle vibration with its natural frequencies. Accordingly, the ECU 60 assigns the current non-calibrated steering wheel angle $\theta_R$ generated from the semi-RSAS 82 as an initial offset $\Delta\theta(t_0)$.

Upon calculating an initial RSAS offset $\Delta\theta(t_0)$, the system 50 may enter the request semi-RSAS output AVAILABLE flag state 170. After the initial offset $\Delta\theta(t_0)$ has been determined, the ECU 60 requests the calibration module 80 to output the AVAILABLE status flag. After receiving the request, the calibration module 80 resets the NOT AVAILABLE status flag and outputs the AVAILABLE status flag to confirm the offset setting that the ECU 60 has determined. The semi-RSAS 82 does not change this angle output. The only change that is made is to set the AVAILABLE status flag. As long as power is not interrupted to the calibration module 80, the calibration module 80 outputs the AVAILABLE status flag from that point. If the calibration module 80 is unable to output the AVAILABLE flag within 3.0 seconds, the ECU 60 will issue the semi-RSAS calibration failure, sending the system 50 into the failure state 190. The ECU 60 checks for the AVAILABLE status flag on every software loop.

Once the AVAILABLE status flag has been outputted, the system 50 may enter the ready state 180. This state 180 is designed for calculating the actual steering wheel angle $\theta$ and its velocity, which are to be sent to the vehicle dynamic controller. After receiving the AVAILABLE status flag from the calibration module 80, the ECU 60 activates the vehicle dynamic controller, and the actual steering wheel angle $\theta$ is computed on the basis of the current reading from the semi-RSAS 82 and the initial semi-RSAS offset $\Delta\theta(t_0)$. The actual steering wheel angle $\theta$ is calculated by the equation $\theta=\theta_R-\Delta\theta(t_0)$. As noted earlier with reference to FIG. 1, $\theta$ represents the actual steering wheel angle, $\theta_R$ represents raw steering data obtained from the semi-RSAS 82, and $\Delta\theta(t_0)$ represents an initial semi-RSAS offset.

Furthermore, in the ready state 180, long-term offset adjustment starts. In this state, the ECU 60 checks CAN BUS status, YRS signal valid, and semi-RSAS signal valid for calculating the actual steering wheel angle $\theta$. After calculating the initial offset $\Delta\theta(t_0)$, the ECU 60 continues to monitor the vehicle performance via the sensor module 90 to adjust the semi-RSAS offset $\Delta\theta$ to eliminate the deviation of sample data. This long-term calculation is continually updated and stores a current semi-RSAS offset value $\Delta\theta(t_n)$. When the ignition is turned off, that is the vehicle enters the ignition-off state, the ECU 60 might store the current semi-RSAS offset $\Delta\theta(t_n)$ if the difference between $\Delta\theta(t_n)$ and the last known initial offset $\Delta\theta(t_0)$ is more than ten degrees.

After the initial semi-RSAS offset $\Delta\theta(t_0)$ has been calculated, the amplitudes of frequency spectrum are calculated further on, so long as the driving conditions are fulfilled. When a new semi-RSAS offset is calculated the semi-RSAS offset is continuously adjusted via the long-term filter. If any of the basic conditions are not satisfied, the ECU 60 stops calculating in the spectrum frequency and resets all of the corresponding calculation variables. If the amplitude of the current sample is less than the last amplitude, the semi-RSAS offset $\Delta\theta(t_n)$ will be replaced with the current sample or unfiltered $\Delta\theta_{unfil}(t_n)$. If the amplitude of the current sample is equal to or larger than the last known amplitude, the semi-RSAS offset $\Delta\theta(t_n)$ will be assigned by a filtered semi-RSAS offset $\Delta\theta_{fil}(t_n)$. Accordingly, the above equation becomes $\theta=\theta_R-\Delta\theta(t_n)$.

In this ready state, the system 50 will move to the failure state 190 only if a) a CAN BUS failure was detected wherein the ECU 60 will disable the offset calibration, b) the yaw rate signal is invalid within three seconds, wherein the ECU 60 will issue a yaw rate failure and disable the offset calibration, c) the semi-RSAS data is not valid within three seconds, wherein the ECU will issue a semi-RSAS failure and disable the offset calibration, and d) the semi-RSAS outputs the NOT AVAILABLE status flag.

The failure state 190 results in the ECU 60 storing a failure flag to the EEPROM 70 if a failure is related with any signal of the sensor module 90 or the signal of the calibration module 80. The failure flag is used in the next ignition cycle to indicate there is no valid semi-RSAS offset $\Delta\theta$ available. When the signal of one of the sensors becomes invalid, the ECU 60 has no way to judge if the conditions for computing a semi-RSAS offset (either initial or long-term) are truly satisfied. After ignition-on, if the ECU 60 receives the failure flag from the EEPROM 70, even if the calibration module 80 outputs the AVAILABLE status flag, the ECU 60 will treat the system 50 as having no valid semi-RSAS offset value, and will begin monitoring vehicle performance to determine and compute an initial offset $\Delta\theta(t_0)$. After an initial offset has been determined, the ECU 60 requests the calibration module 80 to output the AVAILABLE status flag and upon receiving this AVAILABLE flag, the ECU 60 declares that a valid offset is available. Accordingly, the ECU 60 will clear the failure flag on the EEPROM 70 to confirm this valid offset $\Delta\theta(t_0)$.

The final state is the ignition-off state 200. After the ignition is switched off, the calibration module 80 will run idle (i.e. not send any data to the ECU 60) to safely store the existing offset $\Delta\theta$ to the EEPROM 70. If the difference between the current filtered $\Delta\theta_{fil}(t_n)$ and the last known semi-RSAS offset stored in the EEPROM $\Delta\theta(t_0)$ is equal to or larger than ten degrees, the ECU 60 stores the $\Delta\theta_{fil}(t_n)$ to the EEPROM 70. Otherwise no new data is stored to the EEPROM 70.

Figure 4:
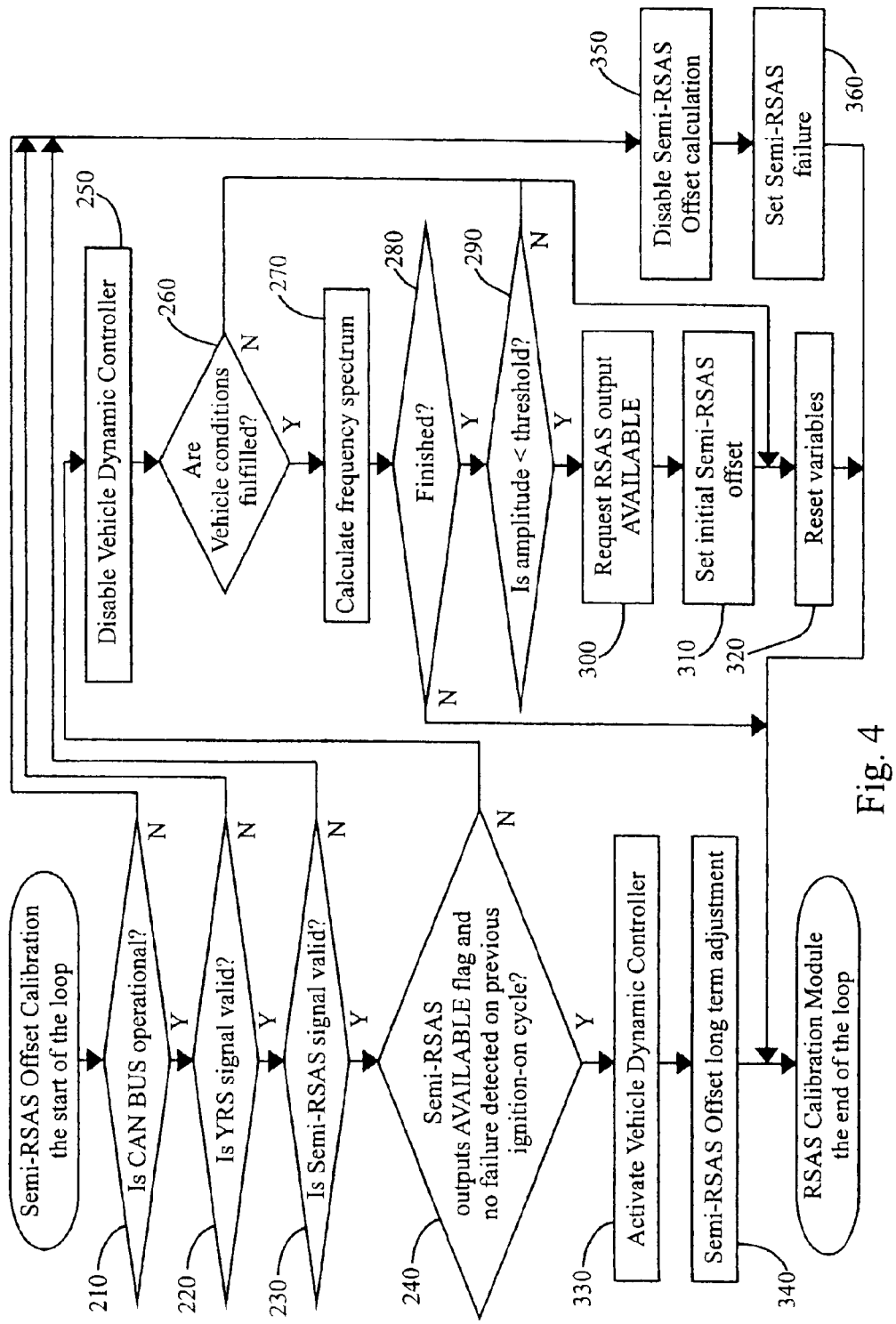
FIG. 4 is a flow chart depicting the offset calibration procedure.

Turning now to FIG. 4, a flowchart describes the semi-RSAS offset calibration procedure on every software loop. The initialization state 110 and the semi-RSAS data checksum state 120 are not included in the software flowchart as these two state variables only run once for each ignition-on cycle. First, to ensure that all necessary signals from the sensors and CAN BUS are valid, the ECU 60 checks the following signals or status. Conditional block 210 checks if the CAN BUS is operational. Conditional block 220 checks if the YRS signal is valid. Conditional block 230 checks if the semi-RSAS signal is valid. If either of conditional blocks 210, 220, or 230 are not satisfied, the ECU 60 will issue the corresponding failure denoted by block 350, which results in the disabling of the semi-RSAS offset calculation/calibration, and the setting of the failure flag to the EEPROM 70 as shown by block 360.

If the conditions represented by blocks 210, 220, and 230 are satisfied, the ECU 60 further reads the semi-RSAS status flag and the failure setting for the previous ignition cycle, as denoted by conditional block 240. If the NOT AVAILABLE status flag is received, or if the failure flag has been set to the EEPROM 70, then the ECU 60 disables the vehicle dynamic controller as shown by block 250, and begins monitoring vehicle performance. More specifically, the ECU 60 checks whether the conditions of block 210, 220, and 230 are valid, and further whether the vehicle is driving on a smooth surface of road in a straight-ahead maneuver at a predetermined threshold speed or higher. If these conditions are not satisfied the ECU 60 clears all the calculation variables as denoted by block 320 and foregoes the end of this loop. If these conditions are fulfilled, the ECU 60 calculates the frequency spectrum as denoted by block 270. Conditional block 280 is to check if the calculation has finished. If the calculation is not finished, the software returns to the end of the loop. If the calculation is finished, the ECU calculates the amplitudes. A conditional block 290 checks all of these amplitudes to determine whether or not they are less than predetermined thresholds. If one of the amplitudes is larger than the corresponding threshold, all of the variables that are used for calculation of the offset (block 320) and the software goes to the end of the loop. If all the amplitudes are less than the thresholds, the ECU 60 treats the current driving condition as the straight-ahead and stable condition. Accordingly, the ECU 60 requests the calibration module 80 to output the AVAILABLE status flag to confirm the offset setting, as denoted by block 300. If the ECU does not receive the AVAILABLE status flag within 3.0 seconds, a communication failure is issued. As denoted by block 310, if the ECU 60 receives the AVAILABLE status flag, the current steering wheel angle reading $\theta_R$ is set as the initial semi-RSAS offset $\Delta\theta(t_0)$. Thereafter, all of the variables that are used for calculation of the offset are reset as denoted by block 320. At this point, the ECU 60 is ready to calculate the long-term offset adjustment.

Moving back to conditional block 240, if the AVAILABLE status flag is received, and the failure flag indicates there is no failure in the sensors from the previous ignition cycle, the ECU 60 extracts the last known offset value $\Delta\theta_{fil}(t_n)$ from the EEPROM 70. This value $\Delta\theta(t_n)$ is set as the initial offset $\Delta\theta(t_0)$ for the current ignition cycle. Thereafter, the ECU 60 activates the vehicle dynamic controller as shown by block 330. At this point, long-term offset adjustment starts as shown by block 340.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for determining an actual steering wheel angle $\theta$ of a vehicle steering mechanism, the vehicle steering mechanism having an initial steering wheel angle $\theta_1$ when the vehicle enters an ignition-on state, the vehicle steering mechanism having a center steering wheel angle $\theta_0$ when the vehicle is heading straight-forward, the method comprising the steps of:

determining a semi-relative steering wheel angle offset $\Delta\theta$ representing the difference between $\theta_1$ and $\theta_0$;

storing $\Delta\theta$ in erasable programmable read-only memory when said vehicle enters an ignition-off state;

measuring a relative steering wheel angle $\theta_R$ from a semi-relative steering wheel angle sensor during the ignition-off state;

retrieving $\Delta\theta$ from the erasable programmable read-only memory when said vehicle enters an ignition-on state;

continuing to measure the relative steering wheel angle $\theta_R$ from the semi-relative steering wheel angle sensor during the ignition-on state; and determining said steering wheel angle $\theta$ based on $\theta_R$ and $\Delta\theta$.

2. The method of claim 1, further comprising the step of detecting if power to the semi-relative steering wheel angle sensor was terminated.

3. The method of claim 2, further comprising the step of re-determining an initial semi-relative steering wheel angle offset $\Delta\theta$ when it is detected that power to the semi-relative steering wheel angle sensor was terminated.

4. The method of claim 1, said vehicle including a sensor cluster including a yaw rate sensor, further comprising the step of determining if a failure has occurred with the sensor cluster.

5. The method of claim 4, further comprising the step of re-determining an initial semi-relative steering wheel angle offset $\Delta\theta$ when it is detected that a failure has occurred with the sensor cluster.

6. The method of claim 1, wherein the semi-relative steering wheel angle sensor is powered independently from the vehicle ignition.

7. The method of claim 1, wherein $\theta=\theta_R-\Delta\theta$.

8. The method of claim 1, wherein the measuring step includes measuring the relative steering wheel angle $\theta_R$ throughout the ignition-off state.

9. A method of determining an actual steering wheel angle θ of a steering mechanism in a vehicle, the vehicle including an electrical control unit in communication with a calibration module, a sensor module and an erasable programmable read-only memory, the calibration module including a semi-relative steering wheel angle sensor reading the relative movement of the steering mechanism, the sensor module including a yaw rate sensor, the method comprising the steps of:

reading a last known semi-relative steering wheel angle offset value $\Delta\theta(t_n)$ from the eraseable programmable read-only memory to the electrical control unit;

determining whether power to calibration module has been terminated determining whether a failure has occurred with the sensor module; and setting the last known semi-relative steering wheel angle offset value $\Delta\theta(t_n)$ as an initial semi-relative steering wheel angle offset value $\Delta\theta(t_0)$ if power to the calibration module was not terminated and no failure occurred with the sensor module.

10. The method of claim 9, further comprising the step of activating a vehicle dynamic controller when the initial semi-relative steering wheel angle offset value $\Delta\theta(t_0)$ has been determined.

11. The method of claim 10, further comprising the step of measuring a semi-relative steering wheel angle $\theta_R$ from said semi-relative steering wheel angle sensor.

12. The method of claim 10, further comprising the step of determining whether the calibration module outputs valid data.

13. The method of claim 9, further comprising the step of calculating an initial semi-relative steering wheel angle offset value $\Delta\theta(t_0)$ if power to the calibration module was terminated or if a failure occurred with the sensor module.

14. The method of claim 13, wherein the step of calculating $\Delta\theta(t_0)$ includes the steps of:

measuring a relative steering wheel angle $\theta_R$ from a semi-relative steering wheel angle sensor;

identifying a center steering wheel angle $\theta_0$ of the steering mechanism representing the vehicle being headed straight-forward and stable; and setting $\Delta\theta(t_0)=\theta_R$ when the steering mechanism has been identified as being at $\theta_0$.

15. The method of claim 14, wherein the vehicle being headed straight-forward is determined only when the CAN BUS is functional, the YRS signal is valid, and the Semi-RSAS signal is valid.

16. The method of claim 14, wherein the vehicle being stable is determined by calculating the amplitudes of predetermined vehicle natural frequencies using an on-line frequency detection method.

17. The method of claim 9, further comprising the steps of:

determining whether communication between the electrical control unit and the sensor module is functional; and determining whether communication between the electrical control unit and the calibration module is functional.

18. A method for determining a steering wheel angle θ of a steering mechanism for a vehicle, the method comprising the steps of:

measuring a relative steering wheel angle $\theta_R$ from a semi-relative steering wheel angle sensor during both ignition-off and ignition-on states of said vehicle;

retrieving a semi-relative steering wheel angle offset $\Delta\theta$ from the erasable programmable read-only memory when said vehicle enters an ignition-on state; and determining said steering wheel angle θ based on $\theta_R$ and $\Delta\theta$.

19. The method of claim 18, further comprising the step of storing the semi-relative steering wheel angle offset $\Delta\theta$ to erasable programmable read-only memory when said vehicle enters an ignition-off state.

20. The method of claim 18, said vehicle including a sensor cluster including a yaw rate sensor, further comprising the steps of re-determining $\Delta\theta$ if the semi-relative steering wheel angle sensor looses power or a failure occurs with the sensor cluster.

21. The method of claim 18, further comprising the step of powering the semi-relative steering wheel angle sensor independently from the vehicle ignition.

22. The method of claim 18, wherein the measuring step includes measuring the relative steering wheel angle $\theta_R$ throughout the ignition-off state.

* * * * *